United States Patent
Ishiguchi

(10) Patent No.: US 7,483,626 B2
(45) Date of Patent: Jan. 27, 2009

(54) PORTABLE DVD PLAYER AND OPTICAL DISC PLAYER

(75) Inventor: Fusao Ishiguchi, Osaka (JP)

(73) Assignee: Funai Electric Co., Ltd., Osaka (JP)

(\*) Notice: Subject to any disclaimer, the term of this patent is extended or adjusted under 35 U.S.C. 154(b) by 693 days.

(21) Appl. No.: 11/224,055

(22) Filed: Sep. 13, 2005

(65) Prior Publication Data
US 2006/0056818 A1    Mar. 16, 2006

(30) Foreign Application Priority Data
Sep. 14, 2004    (JP)    ............ P2004-266575

(51) Int. Cl.
*H04N 5/00* (2006.01)
(52) U.S. Cl. ............................... 386/126
(58) Field of Classification Search ............ 386/46, 386/95, 96, 124–126; 700/94
See application file for complete search history.

(56) References Cited

U.S. PATENT DOCUMENTS

2002/0140627 A1* 10/2002 Ohki et al. ............... 345/1.1
2006/0088292 A1* 4/2006 Guillen et al. ............ 386/96
2006/0235550 A1* 10/2006 Csicsatka et al. .......... 700/94

FOREIGN PATENT DOCUMENTS

JP    3050205 U    4/1998

\* cited by examiner

*Primary Examiner*—Thai Tran
*Assistant Examiner*—Mishawn Dunn
(74) *Attorney, Agent, or Firm*—Morgan, Lewis & Bockius LLP

(57) ABSTRACT

A portable DVD player or optical disc player instructs an interior selection state to an output selector and outputs an internal signal to an output terminal. Whether a lock slide switch is in the exterior selection state or in the interior selection state is displayed via OSD for a first or second time period. It is possible to let the user check whether the lock slide switch is in the exterior selection state or in the interior selection state without providing a synchronization detection circuit for detecting the synchronization of a video signal output to an output terminal and an OSD image generation circuit for generating a video signal corresponding to an OSD image overlaid on the image of a video signal before the output terminal.

5 Claims, 3 Drawing Sheets

PORTABLE DVD PLAYER AND OPTICAL DISC PLAYER

BACKGROUND OF THE INVENTION

1. Field of the Invention

The present invention relates to an optical disc player for playing an optical disc, and in particular to a portable DVD player having a display that may be used outdoors also.

2. Description of the Related Art

In a related art, optical disc players for playing video or voice recorded on an optical disc such as a CD and a DVD have been in commercial use. In practical use are portable DVD players equipped with a small display suitable for outdoor applications. A general portable DVD player includes a switch for toggling between an external signal and an internal signal. The external signal is related to video and voice of an externally input television broadcast. The internal signal is related to video and voice recorded on a DVD played back in a disc player. The user operates the switch to selectively output video or voice corresponding to the external signal or the internal signal.

As the switch operated by the user to toggle between an external signal and an internal signal, a lock slide switch that maintains the post-operation state is mounted on a side of the main unit case of a general portable DVD player. When the main unit is powered, the portable DVD player displays, for a certain time, via OSD, on the display, which of the external or internal signal is selected by the switch. As described in JP-UM-A-3050205 for example, a synchronization detection circuit for detecting the synchronization of a video signal output to an output terminal and an OSD image generation circuit for generating a video signal corresponding to an OSD image overlaid on the image of a video signal output to an output terminal are provided before the output terminal. When the main unit is powered, which of the external or internal signal is selected is displayed on the display via OSD for a certain time. Main reasons for this configuration are described below.

When the user operates the portable DVD player without an external input signal coupled thereto, in case the external signal is selected by the switch, video or voice recorded on a DVD set in the main unit, if any. The external signal is not coupled, so that the video or voice corresponding to the external signal selected by the switch is not output. In other words, the portable DVD player does not output video or voice. As mentioned above, the switch for toggling between an external signal and an internal signal is a slide switch mounted on the side face of the main unit case. The user could assume a unit fault without checking the switch state. In order to avoid the user's misunderstanding, an OSD image is used to let the user recognize the switch state.

SUMMARY OF THE INVENTION

The related art system is disadvantageous in that a synchronization detection circuit for detecting the synchronization of a video signal output to an output terminal and an OSD image generation circuit for generating a video signal corresponding to an OSD image overlaid on the image of a video signal output to an output terminal are provided before the output terminal, so as to overlay an OSD image on an external and internal signals. This results in a larger unit size and inconvenience in outdoor use.

It is an object of the invention to provide a portable DVD player and an optical disc player in reduced size capable of displaying which of an external or internal signal is selected on the main unit when the power is turned on.

According to one aspect of the invention, an optical disc player including: a reading unit reading data related to a video and voice recorded on a DVD set in a main unit; a reproduced signal generation unit generating a reproduced signal that is based on the data read by the reading unit; an output selector unit toggling an output signal output to an output terminal to the reproduced signal generated by the reproduced signal generation unit or an external input signal input from a unit connected to the external input terminal depending on the state of a lock switch provided on the main unit; a display unit extracting the output signal output to the output terminal and displaying video; an image storage unit storing a specific image data; and a control unit instructing the output selector unit to output the reproduced signal to the output terminal when an operating power is fed to the main unit while the lock switch is in an exterior selection state where the external input signal is selected as an output signal to be output to the output terminal, the control unit instructing the reproduced signal generation unit to generate a reproduced signal corresponding to an OSD image indicating the exterior selection state overlaid on the specific image stored in the image storage unit, and the control unit instructing the output selector unit to output the external input signal to the output terminal once a first time period has elapsed.

In this configuration, when the lock switch is in the exterior selection state as the operating power is fed, the control unit instructs the output selector unit to output a reproduced signal to the output terminal. The output selector unit follows the instruction to output the reproduced signal generated by the reproduced signal generation unit to the output terminal. The control unit instructs the reproduced signal generation unit to generate a reproduced signal corresponding to an OSD image indicating the exterior selection state overlaid on the an image corresponding to a video signal. The reproduced signal generation unit follows this instruction and outputs a reproduced signal corresponding to the OSD image overlaid. Thus, a reproduced signal is output to the output terminal corresponding to an OSD image indicating the exterior selection state overlaid on the image corresponding to a video signal. The control unit instructs the output selector unit to output an external input signal to the output terminal when a first time period has elapsed. This causes the output selector unit to accordingly output the external input signal to the output terminal. This eliminates the need for a synchronization detection circuit for detecting the synchronization of a video signal output to an output terminal and an OSD image generation circuit for generating a video signal corresponding to an OSD image overlaid on the image of a video signal output to an output terminal provided before the output terminal of a related art unit. The output selector unit is coupled to the signal generation means so that an OSD image is output for a first time period to let the user check that the lock switch is in the exterior selection state. This avoids the user's misunderstanding that the unit is faulty as well as outputs video and voice related to the external input signal after the first time period as long as the lock switch is the exterior selection state.

According to another aspect of the invention, the optical disc player further includes an image storage unit for storing specific image data. When an operating power is fed to the main unit while the lock switch is in an exterior selection state where the external input signal is selected as an output signal to be output to the output terminal, the control unit instructs the reproduced signal generation unit to generate a reproduced signal corresponding to an OSD image indicating the exterior selection state overlaid on the specific image stored in the image storage unit.

In this configuration, the control unit control unit instructs the reproduced signal generation unit to generate a reproduced signal corresponding to an OSD image indicating the exterior selection state overlaid on the specific image stored in the image storage unit. This causes the reproduced signal generation unit to generate and output a reproduced signal corresponding to an OSD image indicating the exterior selection state overlaid on the specific image stored in the image storage unit in accordance with this instruction. Thus, a screen where an OSD image indicating the exterior selection state is overlaid does not have a single-color background such as blue back, which provides the user with a better view.

According to another aspect of the invention, when the lock switch is toggled to the exterior selection state where the external input signal is selected from the interior selection state where the reproduced signal is selected as an output signal to be output to the output terminal, the control unit instructs the reproduced signal generation unit to generate a reproduced signal corresponding to an OSD image overlaid indicating the exterior selection state and instructs the output selector unit to output an external input signal to the output terminal when a second time period has elapsed.

In this configuration, when the lock switch is toggled to the exterior selection state from the interior selection state while the portable DVD player is in use, the control unit instructs the reproduced signal generation unit to generate a reproduced signal corresponding to an OSD image overlaid indicating the exterior selection state. In accordance with this instruction, the reproduced signal generation unit outputs the reproduced signal corresponding to an OSD image overlaid indicating the exterior selection state. When a second time period has elapsed, the control unit instructs the output selector unit to output an external signal to the output terminal. The output selector unit accordingly outputs the external signal to the output terminal. This allows the user to check, via an OSD image, that the interior selection state has switched to the exterior selection state.

According to another aspect of the invention, in case the lock switch is toggled from the interior selection state where the reproduced signal is selected as an output signal to be output to the output terminal to the exterior selection state where the external input signal is selected while an optical disc is under playback, the control unit instructs the reproduced signal generation unit to generate a reproduced signal corresponding to an OSD image indicating the exterior selection state overlaid on an image reproduced from the optical disc and wherein, otherwise, the control unit instructs the reproduced signal generation unit to generate a reproduced signal corresponding to an OSD image indicating the exterior selection state overlaid on the specific image stored in the image storage unit.

In this configuration, when the lock switch is toggled to the exterior selection state from the interior selection state while the portable DVD player is in use, the control unit instructs the reproduced signal generation unit to generate a reproduced signal corresponding to an OSD image indicating the exterior selection state overlaid on an image reproduced from the optical disc in case an optical disc is under playback. Otherwise, the control unit instructs the reproduced signal generation unit to generate a reproduced signal corresponding to an OSD image indicating the exterior selection state overlaid on the specific image stored in the image storage unit. In accordance with this instruction, the reproduced signal generation unit outputs the reproduced signal corresponding to an OSD image indicating the exterior selection state overlaid on the specific image stored in the image storage unit. As a result, whether an optical disc is under playback or not when the lock switch is toggled from the interior selection state to the exterior selection state, a screen where an OSD image indicating the exterior selection state is overlaid does not have a single-color background such as blue back, which provides the user with a better view.

According to the above-aspects of the invention, the player does not require a synchronization detection circuit for detecting the synchronization of a video signal output to an output terminal or an OSD image generation circuit for generating a video signal corresponding to an OSD image overlaid on the image of a video signal output to an output terminal, which downsizes the unit. The output selector unit is coupled to the signal generation means so that an OSD image is output for a first time period to let the user check that the lock switch is in the exterior selection state. This avoids the user's misunderstanding that the unit is faulty.

DESCRIPTION OF THE PREFERRED EMBODIMENTS

Figure 1:
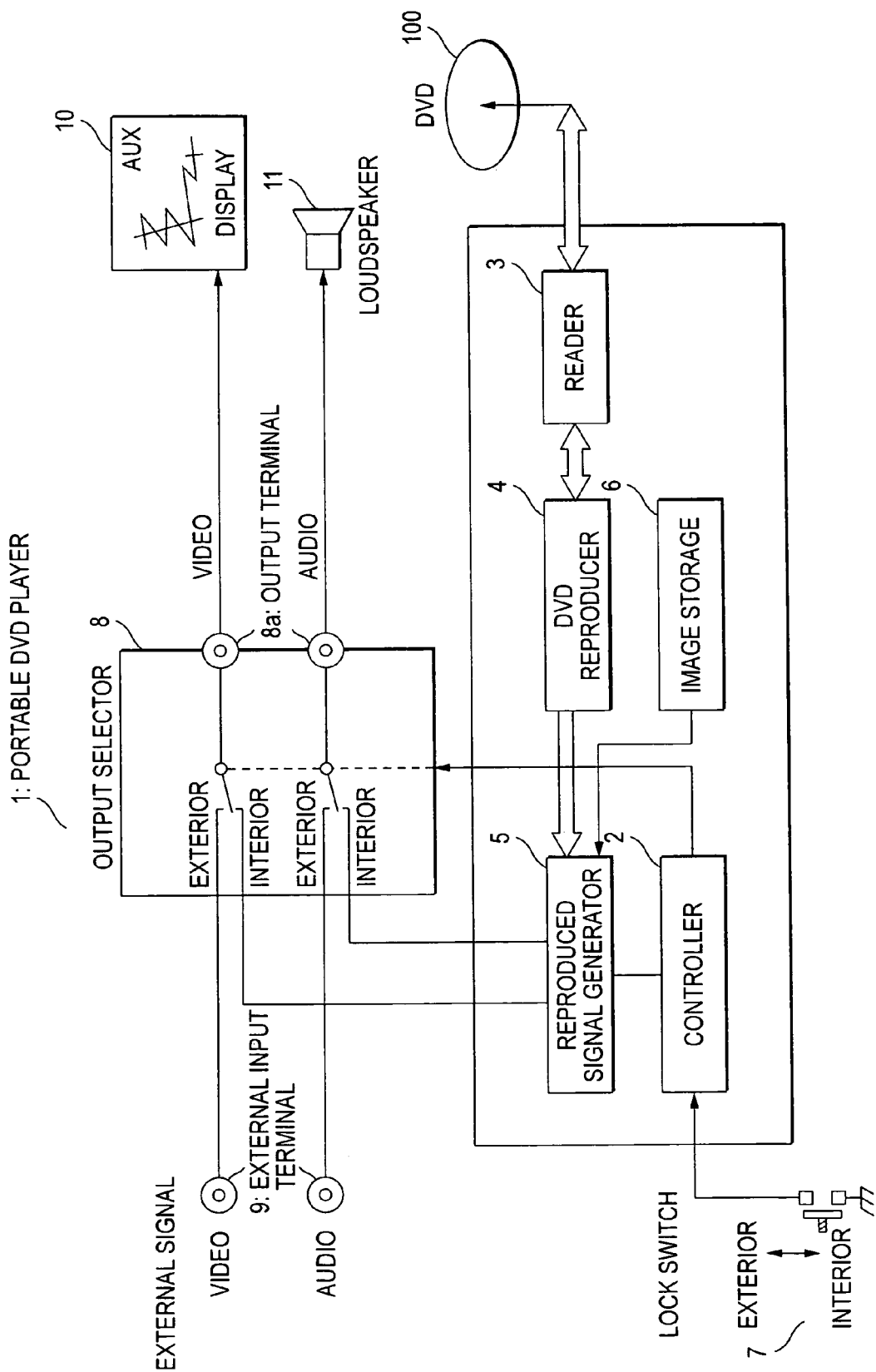
FIG. 1 is a block diagrams showing a configuration of a portable DVD player according to an embodiment of the invention.

FIG. 1 is a block diagram showing the configuration of a portable DVD player according to an embodiment of the invention. A portable DVD player 1 according to the embodiment of the invention includes: a controller 2 for controlling the operation of a main unit; a reader 3 for reading the data recorded on a DVD 100 set in the main unit and outputting an RF signal as its read signal; a DVD reproducer 4 for processing the RF signal and extracting/outputting data of video and voice, a reproduced signal generator 5 for decoding the data of video and voice and generating/outputting a reproduced video signal and a reproduced voice signal (hereinafter, referred to as "a reproduced signal"); an image storage 6 for storing specific image data; a lock switch 7 for selecting between an exterior selection state where an external input signal input from a unit connected to an external input terminal 9 is selected as an output signal to be output to an output terminal 8a and an interior selection state where a reproduced signal is selected as an output signal to be output to an output terminal 8a; an output selector 8 for switching between the reproduced signal and the external input signal as an output signal to be output to an output terminal 8a; a display 10 for displaying video that is based on a video signal output to the output terminal 8 of the output selector 8; and a loudspeaker 11 for outputting voice that is based on a voice signal output to the output terminal 8 of the output selector 8.

In accordance with the state of the lock switch 7, the controller 2 instructs the output selector 8 to output either a reproduced signal or an external input signal to the output terminal 8a. The reader 3 is equipped with a pickup head. The pickup head includes an objective lens for condensing laser beams irradiated from a light source LD, LD and a four-part split photoreceptor for detecting a reflected light from the DVD 100. The pickup head uses a four-part split photoreceptor to detect a reflected light from the DVD 100 and outputs an RF signal. The RF signal is a read signal for data recorded on the DVD 100. The reader 3 amplifies the RF signal by way of an RF amplifier and inputs the amplifier RF signal to the DVD reproducer 4. The DVD reproducer 4 processes the RF signal and extracts/outputs video and voice data. The data extracted is encoded for example with MPEG.

The reproduced signal generator 5 generates a reproduced signal corresponding to for example three types of video:
1. Reproduced video signal that is based on the video data recorded on a DVD;
2. Reproduced video signal where an OSD image of an alphabetic letter or a digit is overlaid on the video signal under 1; (The OSD image is an image for displaying such that a textual information signal is superimposed on an image signal.)
3. Reproduced video signal where the OSD image is overlaid on a specific image such as an opening image;

The image storage 6 stores image data of an alphabetic letter or a digit and image data of a specific image such as an opening image. The image data stored in the image storage 6 is also an encoded data. The OSD image is generated by extracting the image data of a necessary character from the image storage 6. A necessary character refers to a character displayed as an OSD image. For example, when "AUX" is to be displayed, the three characters "A", "U" and "X" are necessary characters. An opening image is not in a uniform color and it may be a moving image or a still image.

The lock switch 7 is a slide switch mounted on the side face of the main unit. The output selector 8 may be a switch for maintaining the operation state even when the power is turned off. The output selector 8 may be a switch serving as an initial state. To the external input terminal 9 is input a television broadcast, for example. The display 10 is a liquid crystal display monitor.

Figure 2:
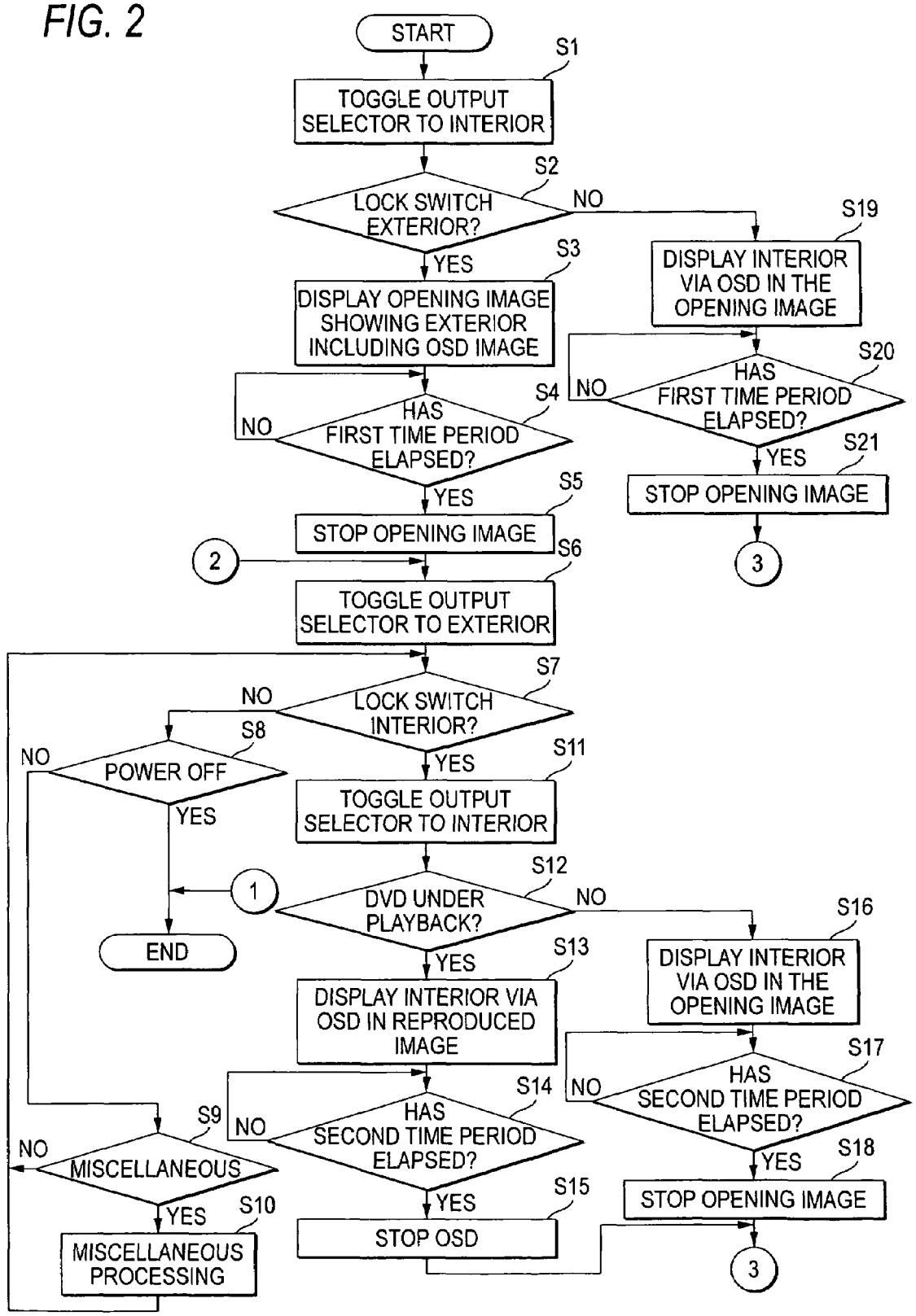
FIG. 2 is a flowchart of the operation of the portable DVD player according to the embodiment of the invention.
Figure 3:
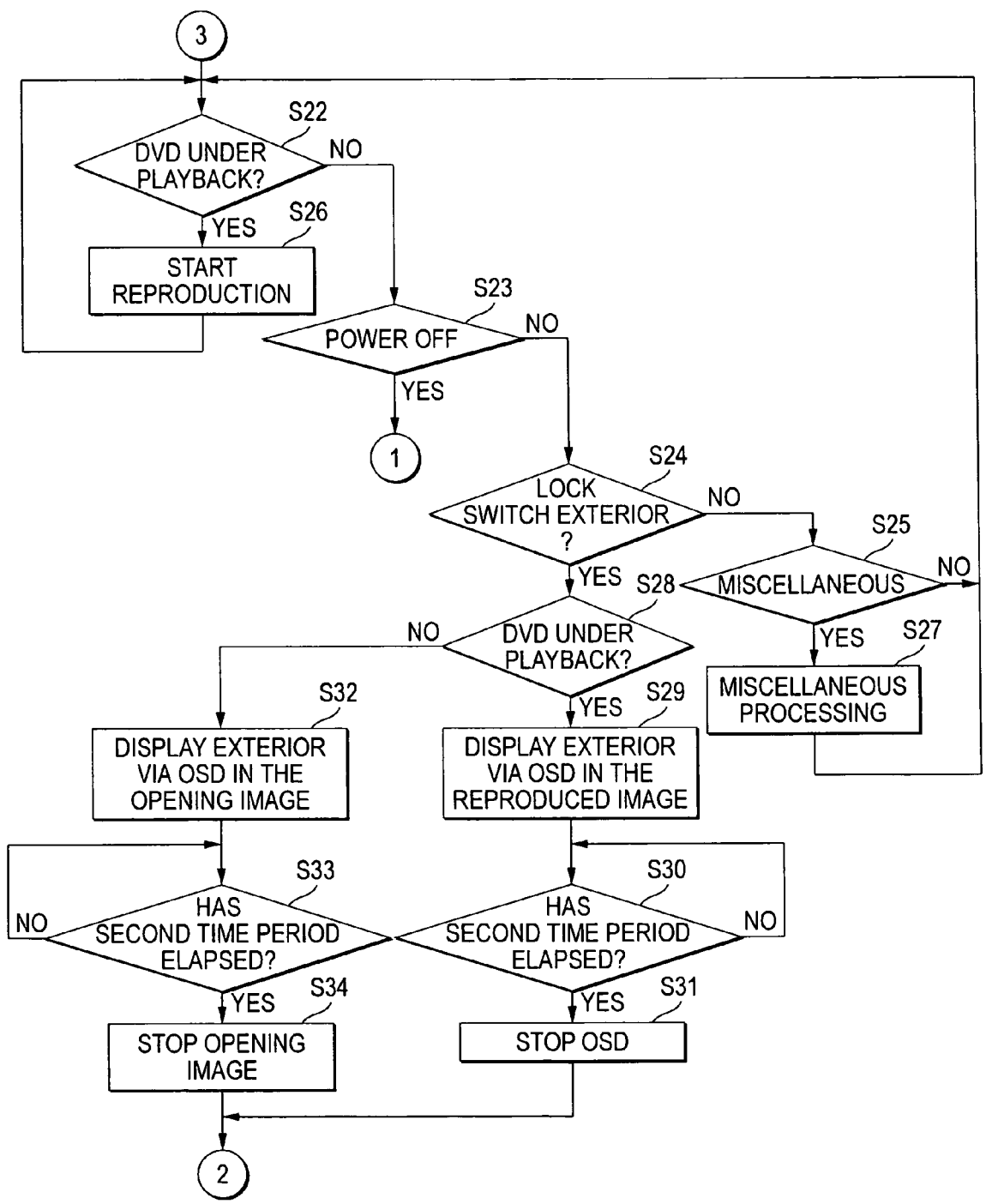
FIG. 3 is a flowchart of the operation of the portable DVD player according to the embodiment of the invention.

Next, operation of the portable DVD player according to an embodiment of the invention will be described. FIGS. 2 and 3 are flowchart showing the operation of a portable DVD player of this embodiment. When the user turns on the power, the controller 2 instructs the interior selection state to the output selector 8 (S). This causes the output selector 8 to switch to the interior selection state. The output selector 8 may be a switch may be a switch for maintaining the operation state even when the power is turned off. The output selector 8 may be a switch serving as an initial state. The controller 2 determines whether the lock switch 7 is in the exterior selection state (S2). In case it is in the exterior selection state, the controller 2 instructs the reproduced signal generator 5 to generate a reproduced signal of an image where an OSD image indicating the exterior selection state overlaid on an opening image (S3). The image storage 6 stores image data of an alphabetic letter and a digit and image data of an opening image. The image data stored in the image storage 6 is encoded data. The reproduced signal generator 5 reads an opening image from the image storage 6, reads the image data of a character to be displayed as an OSD image, and generates/outputs a reproduced video signal of the video specified by the controller 2. The reproduced video signal is input to the display 10 via the output terminal 8a. Thus, on the display 10 appears an image including an OSD image indicating the exterior selection state overlaid on an opening image. The user checks this image to recognize that an external signal is selected by the lock switch 7. An opening image is not in a uniform color and it may be a moving image or a still image.

When a first time interval has elapsed (S4), the controller 2 instructs the reproduced signal generator 5 to stop generating a video signal (S5). The controller 2 instructs the exterior selection state to the output selector 8 (S6). This switches the output selector 8 to the exterior selection state. The first time interval should be long enough for the user to check that an external signal is selected and for example 4 to 5 seconds.

Thus, unlike a related art unit, without providing a synchronization detection circuit for detecting the synchronization of a video signal output to an output terminal and an OSD image generation circuit for generating a video signal corresponding to an OSD image overlaid on the image of a video signal output to an output terminal are provided before the output terminal, it is possible to display on the display 10 an image with an OSD image indicating the exterior selection state overlaid, as long as the lock switch 7 is in the exterior selection state when the power is turned on. This allows downsizing of the unit. The output selector 8 is placed in the interior selection state and an OSD image is output for the first time period in order for the user to check that the lock switch is in the exterior selection state. This avoids the user's misunderstanding that the unit is faulty as well as outputs video and voice related to the external input signal after the first time period following power on as long as the lock switch is the exterior selection state. The display screen does not have a single-color background such as blue back, which provides the user with a better view.

The controller 2 then waits for the lock switch 7 to be toggled to the interior selection state, the power to be turned off, or a miscellaneous input (S7, S8, S9). On the start of playback on the DVD 100, end of playback on the DVD 100, or input such as an increase in the volume level (miscellaneous input), the controller 2 executes the processing (miscellaneous processing) in accordance with the input (S10), and execution returns to S7.

When the lock switch 7 is toggled to the interior selection state, the controller 2 instructs the interior selection state to the output selector 8 (S11). The output selector 8 is accordingly toggled to the interior selection state. The controller 2 determines whether the DVD 100 is currently under playback (S12). In case the DVD. 100 is under playback, the controller 2 instructs the reproduced signal generator 5 to generate a video signal corresponding to an OSD image of a character indicating the interior selection state overlaid on an image being played back (S13). In accordance with the instruction, the reproduced signal generator 5 generates and outputs a video signal corresponding to an OSD image of a character indicating the interior selection state overlaid on an image being played back. The reproduced video signal is input to the display 10 via the output terminal 8a. Thus, an image including an overlaid OSD image indicating the interior selection state is displayed on the display 10. The user checks the image to recognize that the lock switch 7 is toggled to the interior selection state. The OSD image indicating the interior selection state is for example "DVD".

When a second time period has elapsed (S14), the controller 2 instructs the reproduced signal generator 5 to stop generating a reproduced video signal corresponding to an OSD image overlaid on the image of a video signal (S15) and execution jumps to step S22 mentioned later. The second time interval should be long enough for the user to check that an external signal is selected and for example 2 to 3 seconds. The second time interval is shorter than the first time interval but presents no problems because the lock switch has just been operated.

Unless a DVD is under playback in S12, the controller 2 instructs the reproduced signal generator 5 to generate a reproduced video signal corresponding to an OSD image overlaid on an opening image (S16). In accordance with this instruction, the reproduced signal generator 5 generates and outputs a reproduced video signal corresponding to an OSD image overlaid on an opening image. The reproduced video signal is input to the display 10 via the output terminal 8a. Thus, an image including an overlaid OSD image indicating the interior selection state is displayed on the display 10. The user checks the image to recognize that the lock switch 7 is toggled to the interior selection state.

When the second time period has elapsed (S17), the controller 2 instructs the reproduced signal generator 5 to stop generating a reproduced video signal corresponding to an OSD image overlaid on the image of a video signal (S18) and execution jumps to step S22 mentioned later.

In case the lock switch 7 is not in the exterior selection state but in the interior selection state in step S2, the controller 2 instructs the reproduced signal generator 5 to generate a reproduced signal corresponding to an OSD image indicating the interior selection state overlaid on an opening image (S19). The reproduced signal generator 5 reads an opening image from the image storage 6, reads the image data of a character to be displayed as an OSD image, and generates/outputs a reproduced video signal of the video specified by the controller 2. The reproduced video signal is input to the display 10 via the output terminal 8a. Thus, on the display 10 appears an image including an OSD image indicating the interior selection state overlaid on an opening image. The user checks this image to recognize that an internal signal is selected by the lock switch 7.

When a first time interval has elapsed (S20), the controller 2 instructs the reproduced signal generator 5 to stop generating a video signal (S21). The controller 2 then waits for the lock switch to be toggled to the exterior selection state, the power to be turned off, or a miscellaneous input (S22, S23, S24, S25). When the power is turned off, this processing is terminated. On an input related to the playback of a DVD, playback of the DVD starts (S26), and execution returns to S22. On an input such as an increase in the volume level (miscellaneous input), the controller 2 executes the processing (miscellaneous processing) in accordance with the input (S27), and execution returns to S22. When the lock switch 7 is toggled to the exterior selection state, the controller 2 determines whether the DVD 100 is currently under playback (S28). In case the DVD 100 is under playback, the controller 2 instructs the reproduced signal generator 5 to generate a video signal corresponding to an OSD image indicating the exterior selection state overlaid on an image from the DVD being played back (S29). In accordance with the instruction, the reproduced signal generator 5 generates and outputs a video signal corresponding to an OSD image indicating the exterior selection state overlaid on an image from the DVD being played back. The reproduced video signal is input to the display 10 via the output terminal 8a. Thus, an image including an overlaid OSD image indicating the exterior selection state is displayed on the display 10. The user checks the image to recognize that the lock switch 7 is toggled to the exterior selection state.

When a second time period has elapsed (S30), the controller 2 instructs the reproduced signal generator 5 to stop generating a video signal corresponding to an OSD image overlaid on the image of a video signal (S31) and execution jumps to step S6 where the controller 2 instructs the exterior selection state to the output selector 8. This toggles the output selector 8 to the exterior selection state. In S31, playback of the DVD is not stopped but continued.

In case the DVD is not under playback in S28, for example, in case the main unit is powered to watch a television broadcast program, the lock switch 7 is set to the interior selection state when the power is turned on, the controller 2 instructs the reproduced signal generator 5 to generate an image including an OSD image indicating the exterior selection state overlaid on an opening image (S32). In accordance with this instruction, the reproduced signal generator 5 generates and outputs a reproduced video signal corresponding to an OSD image indicating the exterior selection state overlaid on an opening image. The reproduced video signal is input to the display 10 via the output terminal 8a. Thus, an image including an overlaid OSD image indicating the exterior selection state is displayed on the display 10. The user checks the image to recognize that the lock switch 7 is toggled to the exterior selection state.

When a second time period has elapsed (S33), the controller 2 instructs the reproduced signal generator 5 to stop generating a video signal corresponding to an OSD image overlaid on the image of a video signal (S34) and execution returns to step S6 where the controller 2 instructs the exterior selection state to the output selector 8. This toggles the output selector 8 to the exterior selection state.

In this way, the portable DVD player according to this embodiment instructs the interior selection state to the output selector 8 irrespective of the lock slide switch 7 when the slide switch is toggled or power is turned on and outputs an internal signal to the output terminal 8. Whether the lock slide switch 7 is in the exterior selection state or in the interior selection state is displayed via OSD for a first or second time period. Unlike a related art unit, it is possible to let the user check whether the lock slide switch 7 is in the exterior selection state or in the interior selection state without providing a synchronization detection circuit for detecting the synchronization of a video signal output to an output terminal and an OSD image generation circuit for generating a video signal corresponding to an OSD image overlaid on the image of a video signal before the output terminal 8a.

What is claimed is:

1. A portable DVD player comprising:
    a reading unit reading data related to a video and voice recorded on a DVD set in a main unit;
    a reproduced signal generation unit generating a reproduced signal that is based on the data read by the reading unit;
    an output selector unit toggling an output signal output to an output terminal to the reproduced signal generated by the reproduced signal generation unit or an external input signal input from a unit connected to the external input terminal depending on the state of a lock switch provided on the main unit;
    a display unit extracting the output signal output to the output terminal and displaying video;
    an image storage unit storing a specific image data; and
    a control unit instructing the output selector unit to output the reproduced signal to the output terminal when an operating power is fed to the main unit while the lock switch is in an exterior selection state where the external input signal is selected as an output signal to be output to the output terminal, the control unit instructing the reproduced signal generation unit to generate a reproduced signal corresponding to an OSD image indicating the exterior selection state overlaid on the specific image stored in the image storage unit, and the control unit instructing the output selector unit to output the external input signal to the output terminal once a first time period has elapsed,
    wherein, in case the lock switch is toggled from the interior selection state where the reproduced signal is selected as an output signal to be output to the output terminal to the exterior selection state where the external input signal is selected while an optical disc is under playback, the control unit instructs the reproduced signal generation unit to generate a reproduced signal corresponding to the OSD image indicating the exterior selection state overlaid on an image reproduced from the optical disc, wherein, in case the lock switch is toggled from the interior selection state where the reproduced signal is selected as an output signal to be output to the output terminal to the exterior selection state where the external input signal is selected while an optical disc is not under playback, the control unit instructs the reproduced signal generation unit to generate a reproduced signal corresponding to the OSD image indicating the exterior selection state overlaid on the specific image stored in the image storage unit, and wherein the control unit instructs the output selector unit to select to output the exterior input signal to the output terminal when a second period has elapsed.

2. An optical disc player comprising:

a reading unit reading data related to a video and voice recorded on a DVD set in a main unit;

a reproduced signal generation unit generating a reproduced signal that is based on the data read by the reading unit;

an output selector unit toggling an output signal output to an output terminal to the reproduced signal generated by the reproduced signal generation unit or an external input signal input from a unit connected to the external input terminal depending on the state of a lock switch provided on the main unit;

a display unit extracting the output signal output to the output terminal and displaying video;

an image storage unit storing a specific image data; and a control unit instructing the output selector unit to output the reproduced signal to the output terminal when an operating power is fed to the main unit while the lock switch is in an exterior selection state where the external input signal is selected as an output signal to be output to the output terminal, the control unit instructing the reproduced signal generation unit to generate a reproduced signal corresponding to an OSD image indicating the exterior selection state overlaid on the specific image stored in the image storage unit, and the control unit instructing the output selector unit to output the external input signal to the output terminal once a first time period has elapsed.

3. The optical disc player according to claim 2, further comprising:

an image storage unit for storing specific image data, wherein when an operating power is fed to the main unit while the lock switch is in an exterior selection state where the external input signal is selected as an output signal to be output to the output terminal, the control unit instructs the reproduced signal generation unit to generate a reproduced signal corresponding to an OSD image indicating the exterior selection state overlaid on the specific image stored in the image storage unit.

4. The optical disc player according to claim 2, wherein when the lock switch is toggled to the exterior selection state where the external input signal is selected from the interior selection state where the reproduced signal is selected as an output signal to be output to the output terminal, the control unit instructs the reproduced signal generation unit to generate a reproduced signal corresponding to an OSD image overlaid indicating the exterior selection state and instructs the output selector unit to output an external input signal to the output terminal when a second time period has elapsed.

5. The optical disc player according to claim 3, wherein, in case the lock switch is toggled from the interior selection state where the reproduced signal is selected as an output signal to be output to the output terminal to the exterior selection state where the external input signal is selected while an optical disc is under playback, the control unit instructs the reproduced signal generation unit to generate a reproduced signal corresponding to an OSD image indicating the exterior selection state overlaid on an image reproduced from the optical disc and wherein, otherwise, the control unit instructs the reproduced signal generation unit to generate a reproduced signal corresponding to an OSD image indicating the exterior selection state overlaid on the specific image stored in the image storage unit.

* * * * *